(12) United States Patent
Dietsch et al.

(10) Patent No.: US 7,650,013 B2
(45) Date of Patent: Jan. 19, 2010

(54) SYSTEM AND METHOD FOR MAP AND POSITION-DETERMINATION ENHANCEMENT

(75) Inventors: Jeanne Dietsch, Peterborough, NH (US); Matthew LaFary, Peterborough, NH (US)

(73) Assignee: MobileRobots Inc., Amherst, NH (US)

( * ) Notice: Subject to any disclaimer, the term of this patent is extended or adjusted under 35 U.S.C. 154(b) by 645 days.

(21) Appl. No.: 11/274,562

(22) Filed: Nov. 15, 2005

(65) Prior Publication Data

US 2006/0120601 A1 Jun. 8, 2006

Related U.S. Application Data

(60) Provisional application No. 60/627,976, filed on Nov. 15, 2004.

(51) Int. Cl.
*G06K 9/00* (2006.01)
*G05D 1/00* (2006.01)

(52) U.S. Cl. .......................... 382/103; 382/168; 701/28

(58) Field of Classification Search ................. 382/100, 382/103, 106, 107, 110, 118, 153, 162, 168, 382/181, 209, 232, 260, 274, 276, 286, 291–295, 382/305, 312; 717/104; 701/28, 207; 345/158
See application file for complete search history.

(56) References Cited

U.S. PATENT DOCUMENTS

| | | | | | |
|---|---|---|---|---|---|
| 4,933,864 | A | * | 6/1990 | Evans et al. | 701/207 |
| 5,450,504 | A | * | 9/1995 | Calia | 382/118 |
| 6,078,849 | A | * | 6/2000 | Brady et al. | 701/28 |
| 7,002,551 | B2 | * | 2/2006 | Azuma et al. | 345/158 |
| 7,167,579 | B2 | * | 1/2007 | Taniguchi | 382/110 |
| 2004/0168148 | A1 | * | 8/2004 | Goncalves et al. | 717/104 |

* cited by examiner

*Primary Examiner*—Seyed Azarian
(74) *Attorney, Agent, or Firm*—Devine, Millimet & Branch, PA; Raymond I. Bruttomesso, Jr.; Paul C. Remus

(57) ABSTRACT

A system and methods for map and position determination enhancement. The method includes obtaining at least one image of a view in an area. Also, identifying at least one high-contrast feature in the image of the area and, embedding the high-contrast feature in a map of the area. The result is the generation of an enhanced map of the area which can be used to determine the position of any device or object.

17 Claims, 5 Drawing Sheets

SYSTEM AND METHOD FOR MAP AND POSITION-DETERMINATION ENHANCEMENT

CROSS-REFERENCE TO RELATED APPLICATIONS

The present application claims the benefit of provisional application Ser. No. 60/627,976 filed Nov. 15, 2004, which is incorporated herein by reference.

FIELD OF THE INVENTION

The invention relates to a system and methods for map and position determination enhancement.

BACKGROUND OF THE INVENTION

Knowing the current position and orientation of a device relative to other objects can be very important, whether it is a mobile device driving indoors, a vehicle driving outdoors, a sensor or actuator in a sensing/actuating system or a valuable piece of equipment.

Ceiling lights and other high-contrast natural features can be part of the information used to determine another device's location. Ceiling lights by themselves, however, are quite limited. For one thing, they may be turned off. For another, they provide only a very limited amount of information that, like any natural feature, may not always be perceptible from the device. Finally, systems that depend solely on the lights for positioning are typically lost when no light is in view.

To determine the position of a device, a map should be created. However, the map should be created based on reliable objects and features, or another method of creating the map should be used. What is needed is a method and system for map and position determination enhancement that can determine the position of a device even when ceiling lights or natural features have varied.

SUMMARY

In accordance with one aspect of the present invention, a method is disclosed. The method includes obtaining at least one image of a view in an area. Also, identifying at least one high-contrast feature in the image of the area and, embedding the high-contrast feature in a map of the area. The result is the generation of an enhanced map of the area which can be used to determine the position of any device or object.

In accordance with another aspect of the present invention, a method is disclosed. The method includes identifying at least one high-contrast feature in a view using a spatial data collection device. Also, calculating center point coordinates of the at least one high-contrast feature and comparing the center point coordinates from at least two known points of view. A determination of the actual location of the spatial data collection device is done based on results of the comparing.

In accordance with another aspect of the present invention, a method is disclosed. The method includes obtaining at least one an image of a view of an area using a spatial data collection device. Also, identifying at least one high-contrast feature in the image. A determination of the distance of the at least one high-contrast feature from the spatial data collection device is made. A spatial database is generated of the view and the at least one high-contrast feature. This spatial database is embedded onto a previously prepared map of the area. Thus, an enhanced map of the area is generated. This enhanced map can be used to determine position of the device.

In accordance with another aspect of the present invention, a method is disclosed. The method includes generating a map of an area. Also, obtaining at least one image of a view of the area from a predetermined position. Identifying at least one high-contrast image in the view is also included, as is embedding the at least one high-contrast image into the map of the area. This generates an enhanced map of the area, which is used to determine position of a device.

In accordance with another aspect of the invention, a method is disclosed. The method includes obtaining at least one image of a view of an area from a predetermined position. Also, identifying at least one high-contrast image in the view. The at least one high-contrast image is embedded into a pre-existing map of the area. An enhanced map of the area is generated and used to determine position of a device.

Some embodiments of any of the aspects of the invention may include one or more of the following. The method can include providing radiation to the area. The radiation creates the at least one high-contrast feature in the image. Alternatively, the radiation can create an additional at least one high-contrast feature in the image. The method can include generating a map of the area, previous to generating the enhanced map or simultaneous, creating both the map of the area and adding the enhancements to the map. Also, the method can include where the at least one high-contrast feature is at least one ceiling light in the area.

In accordance with another aspect of the present invention, a system is disclosed. The system includes a spatial data collection device. Also, a camera integrated onto the spatial data collection device, the camera facing upward. The system also includes a means for determining the position of the spatial data collection device, and, a means for determining the presence and position of at least one high-contrast feature in a view of an area. Also included in the system, a means for storing the position data of the at least one high-contrast feature and a means for calculating the position of the at least one high-contrast features center point. The system also includes a means for generating an enhanced map of an area using the position data and a previously created map of the area.

Some embodiments of this aspect of the invention may include where the system of claim further includes a means for generating radiation, where the means for generating radiation is integrated onto the spatial data collection device. The means for generating radiation produces at least one high-contrast feature in the view of the area.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein.

DETAILED DESCRIPTION

Figure 1A:
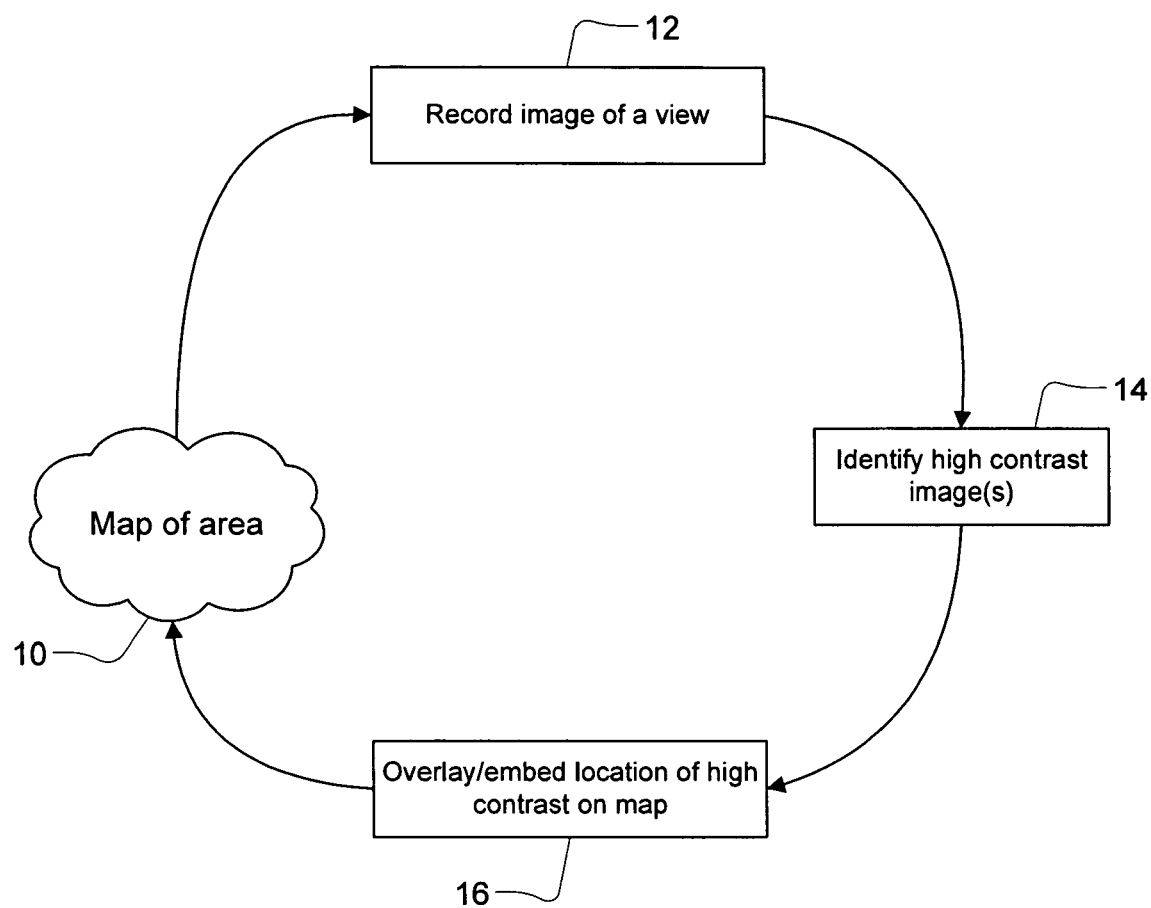
FIG. 1A is a schematic diagram and flow chart illustrating a map and an enhanced map and the method of creating the enhanced map.

The invention is a system and method for map and position determination enhancement. Referring first to FIG. 1, in the preferred embodiment of the invention, a map of the area is provided 10. The area can be either indoors, outdoors or a combination of indoors/outdoors. The "area" is therefore any identified location of which a map of the location is desired.

An imaging device and computational device (or spatial data collection device), or robot, collects an image of a view of the area 12. A high-contrast feature or image is identified in this image of the area and its position relative to the imaging device's current position in space is determined. At least one of more views of the high-contrast area is compared. An enhanced map of the area is created by overlaying or embedding the high-contrast feature or image data onto the map 10. A high-contrast image or feature is either a light or other high-contrast feature. The high-contrast feature can be man made or natural. High-contrast feature, high-contrast image and light are used interchangeably throughout this specification. The high-contrast feature or image is created either by lights on the ceiling of the area, by creating the high-contrast image through radiation or through natural features. Radiation is electromagnetic radiation that can produce a high-contrast image. The radiation can be produced by any device. The invention can be used to map an area either outdoors or indoors.

The system is a robot or a spatial data collector or a person or other means of transporting including a camera and computational means for carrying out the methods according to the embodiments of the invention.

The invention uses an imaging device such as, but not limited to, a videocam, stereocam or infrared camera, at a known location and orientation. The position and orientation may be measured relative to walls, satellites or any other known objects. The location and orientation might be measured by measuring tape, laser scanner or any other measuring method. The imaging device collects visual information from its field of view. The determination of any high-contrast image or images is accomplished by comparing brightness values of the view. Views of the high-contrast area from at least two positions are taken.

Whether the high-contrast feature or image is a 2- or 3-dimensional image, its orientation within the 2- or 3-dimensional map is projected by any mathematical method, such as Euclidean geometry, spherical geometry or trigonometry, for projecting a plane or form onto another plane or 3-dimensional form. Pixels or other segments of the high-contrast images are then associated with the co-located data points within the map. Associations may take the form of simple coordinates, data matrices, equivalences or other means of relating data.

This visually enhanced map that is created may be stored for others to use and/or used to determine the position of any object.

The spatial collection device collects data from a variety of sensors such as range-finders, wheel-shaft encoders and/or gyroscopes and uses Simultaneous Localization And Mapping (SLAM), dead-reckoning, Markov Localization, VSLAM, beacon triangulation, radio triangulation, GPS, and/or other means to determine its expected location and orientation within the map. The spatial collection device(s) also collect(s) visual information from the field of view of an imaging device.

Figure 1B:
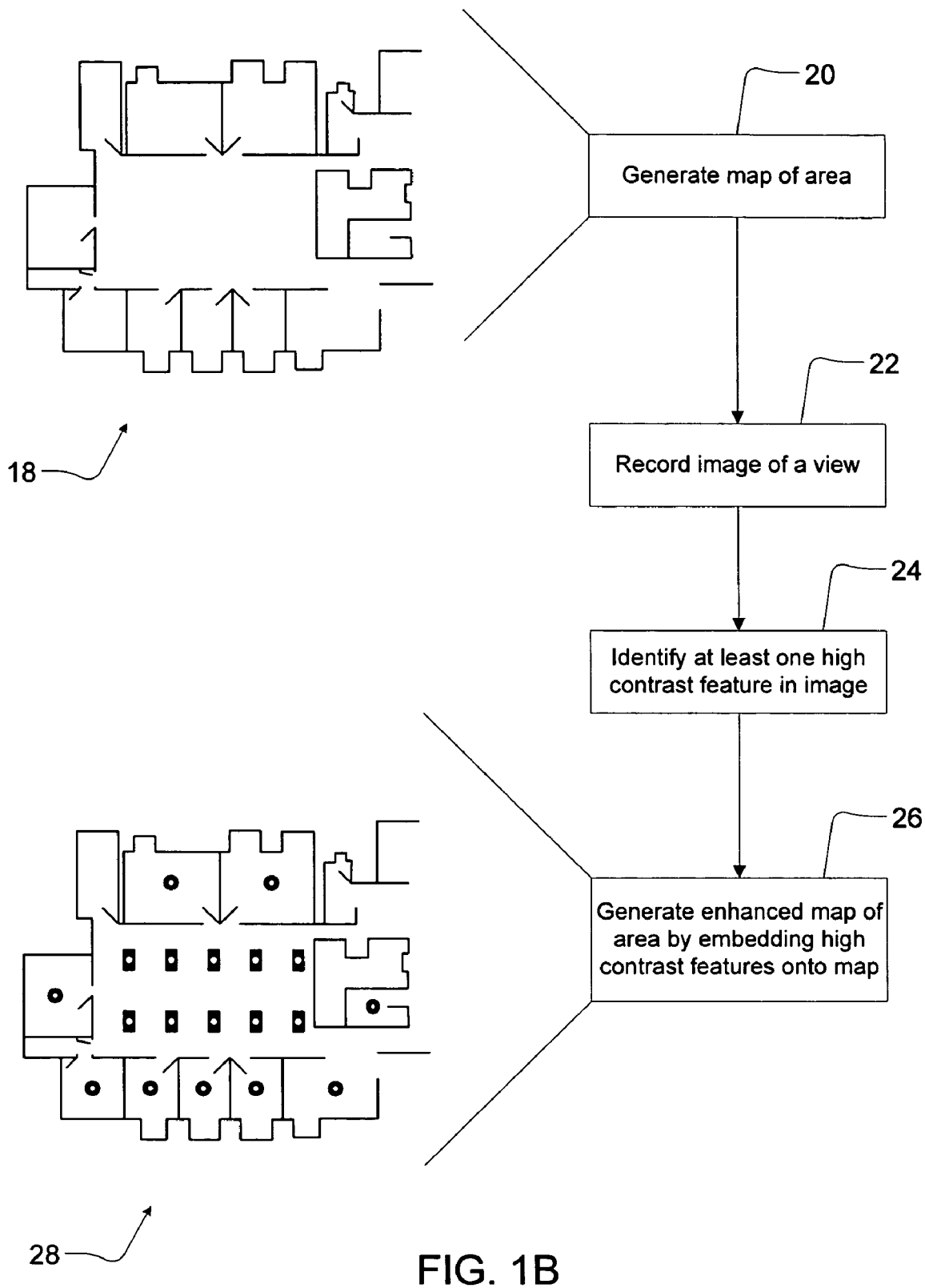
FIG. 1B is a schematic diagram and flow chart illustrating an indoor map and an enhanced indoor map and the method of creating the enhanced map.

A visual imaging device obtains an upward view and a computational device,

Referring now to FIG. 1B, the present invention, in one embodiment, obtains a map 20 of the area or, in alternate embodiments, generates a map 20 of the area, then associates high-contrast images with the map 18. This figure shown only one embodiment, where the invention is used to map an interior. However, in other embodiments, the maps 18, 28, are of an outdoor environment of a combination indoor/outdoor environment. Whether the invention is used to map an indoor, outdoor or indoor/outdoor environment of area, the methods used are the same, only the features of the area change.

The map 18 can be generated 20 by one of a number of known means, including, but not limited to, a GIS map made via satellite; a raster map made according to U.S. Pat. No. 6,917,893 issued to Dietsch et al on Jul. 12, 2005 entitled Spatial Data Collection Apparatus and Method which is herein incorporated by reference; a SLAM map made with a robot; a VSLAM map made with a robot and camera; or a CAD map created with Architectural Desktop; or another type of spatial representation method. Thus, the map can be of either an indoor, outdoor or combination indoor/outdoor area in two or more dimensions.

An image of a view is then collected 22, this view can be of a ceiling or other view, including a natural view, and this image is obtained from at least two known positions and orientations. At least one high-contrast feature is identified 24 in each image of the view and the coordinates allow the location of this high-contrast feature(s) to be overlaid or embedded in a map of the area being viewed 26. The resulting enhanced map 28 may be used to determine the current position of a device fitted with imaging equipment and other position sensors more accurately than would be possible with the map of the area alone (without the enhancements). In addition, the height of the lights or high-contrast feature(s) may be determined by comparing the relative position of the high contrast areas from the robot's POV in various locations.

The system and method of the invention produces positional accuracy even if no high-contrast objects are visible. Positional accuracy is improved because the invention creates visually enhanced maps, if the environments are lit continuously. An actual map is created from the invention. The map is enhanced with high-contrast images.

Alternatively, images of a ceiling or other view, including natural view, is recorded along with other data at the time the map of the area is being made. At least one high-contrast feature is identified in the image and overlaid or embedded within a map of the area being viewed. The resulting map may be used to determine the current position of a device fitted with imaging equipment and range-finding sensors more accurately than would be possible with the unenhanced map alone. In addition, the height of the lights may be determined by comparing the relative position of the high contrast areas from the robot's POV in various locations.

Figure 2B:
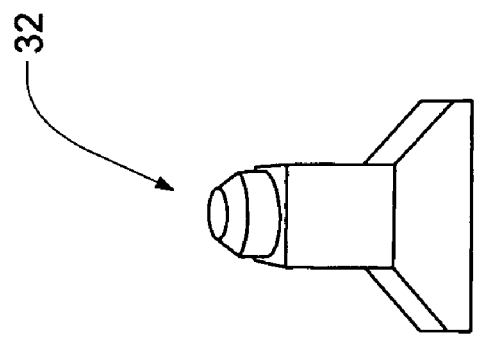
FIG. 2B is an expanded view of one embodiment of the camera, a fish-eye lens.
Figure 2A:
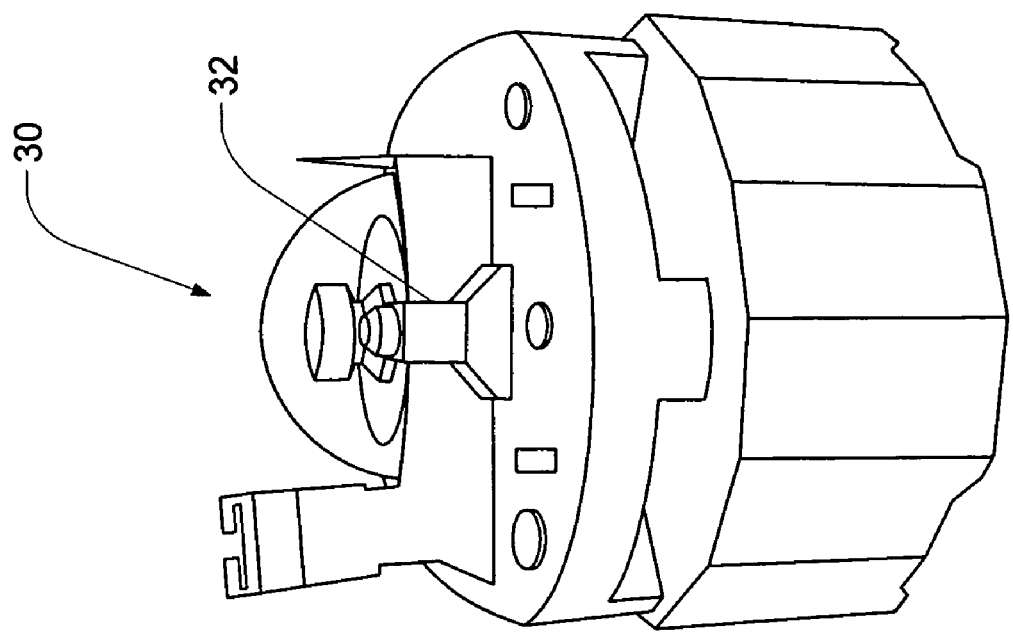
FIG. 2A is one embodiment of a spatial data collection device with one embodiment of the camera, a fish-eye lens, mounted onto the device.

Referring now to FIG. 2A, in the preferred or exemplary embodiment of the invention, a spatial data collection device, a robot 30 in the preferred embodiment, having ARCSinside and a tightly integrated fisheye camera 32 is used. The fisheye camera is facing upward. The spatial data collection device 30 moves around a space with permanent walls and/or fixtures. Using the "Create Map" feature in MobileEyes™ software, the robot tracks its own x,y, theta position, as well as time. As the spatial data collection device moves, it also stores the relative position of the center point of every high-contrast image that it sees. The high-contrast image can be a light or another high-contrast image. Each position of the spatial data collection device is fused with the relative position of the lights.

Referring to FIG. 2B, one embodiment of the camera 32 is shown. Although in the preferred embodiment, a fisheye camera is used, in other embodiments, any camera or image device can be used.

When the device has traversed through all areas in which a map is desired, the data is downloaded into a compiling program known in the art that calculates the position of the high-contrast center point in the map file created using MobilePlans™ software. Other sensor readings are fused into the same map file. In other embodiments, other software that produces the same result is used.

All storage of data is done using any data storage device known in the art. The spatial data collection device or robot is fitted with a storage device to store data. The map file is also created with MobilePlans from data collected with the spatial data collection device.

Figure 3:
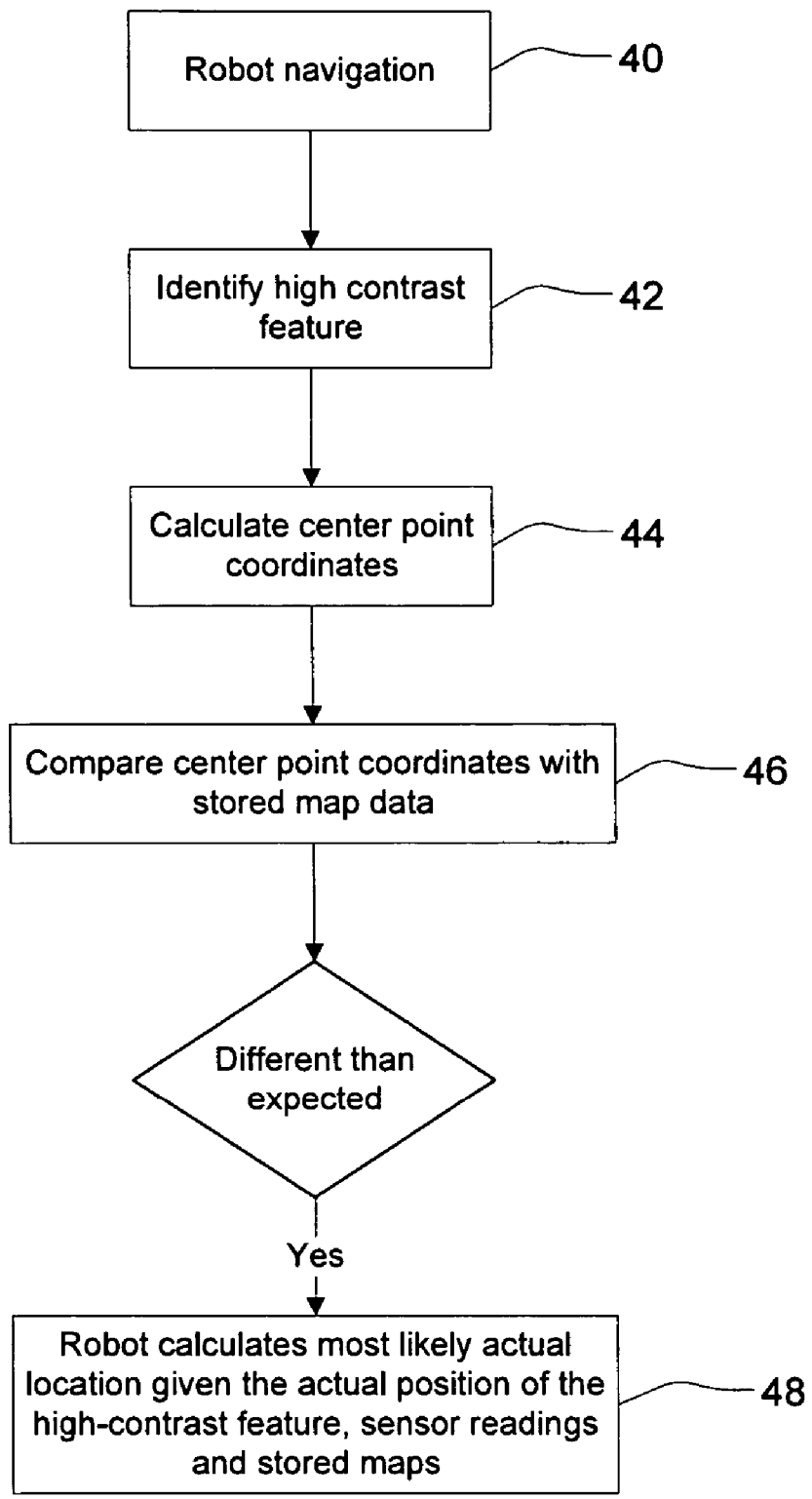
FIG. 3 is a flow chart of the method of autonomous navigation according to one embodiment.
Figure 4:
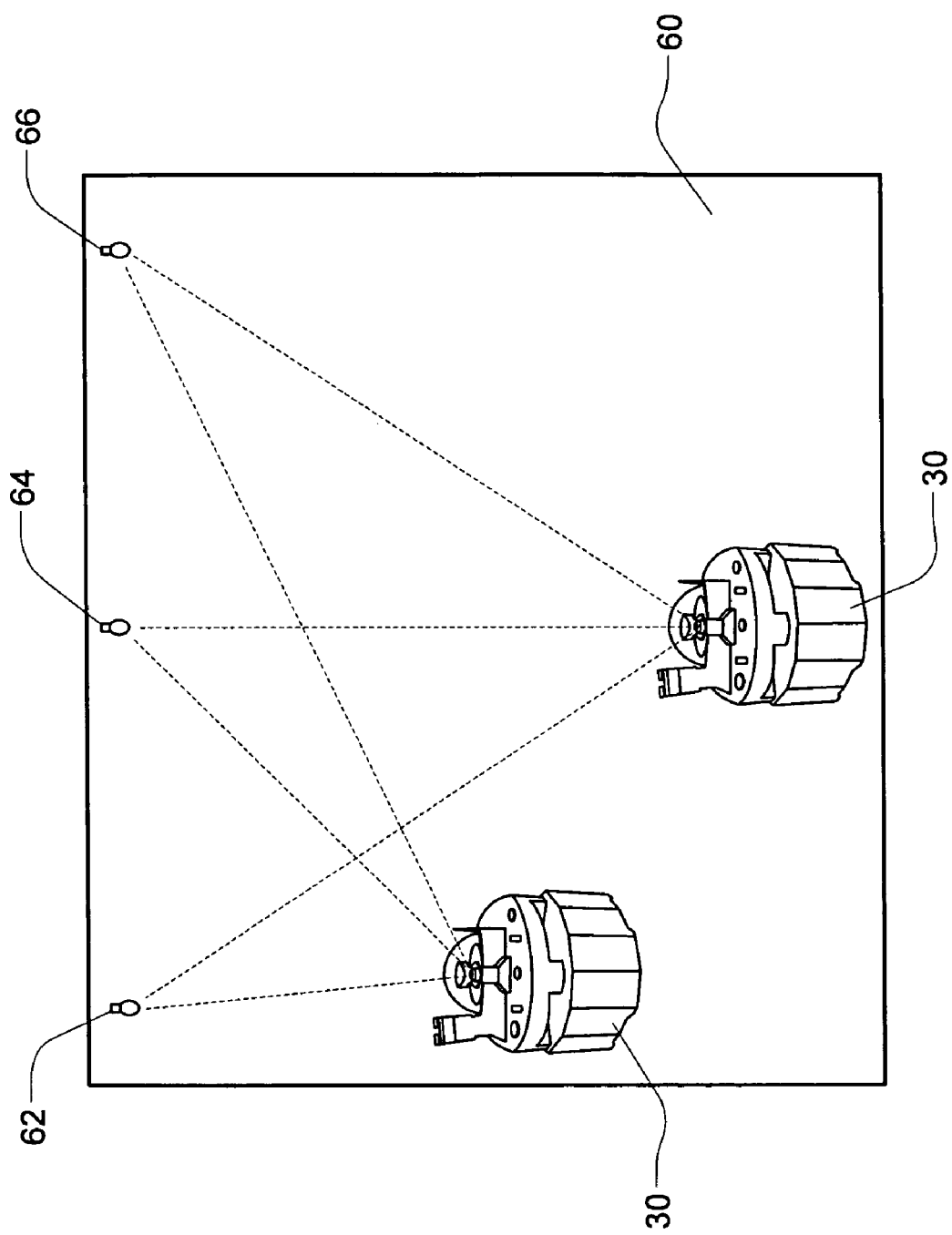
FIG. 4 is an schematic diagram of one method of the robot determining the position of high-contrast features from multiple POVs.

Referring to FIGS. 3 and 5, when the map is complete the robot 30 can navigate autonomously 40 through the environment 60 under MobileEyes software control. In other embodiments, any other software that produces the same result is used. As it travels, the robot will watch for high-contrast areas on the ceiling 62, 64, 66. When a high-contrast feature is visible 42, the robot will calculate the center point of the high-contrast feature 44 and compare it with the expected position, based on the stored map data 46. If a high-contrast feature appears where none is expected 48, the robot will use Markov probability techniques to determine the most likely actual location of the robot, given the position of the high-contrast feature combined with other current sensor readings and stored maps of the space.

In other embodiments, a map of the area is not provided. In these embodiments, a robot with DGPS and a tightly integrated fisheye camera facing upward moves around a space. Using GPS and GIS software, the robot tracks its own x, y, z, theta position and time. As it moves, it also stores the relative position of the center point of every high-contrast that it sees. The high-contrast, in some embodiments, is lights. Each position of the robot is fused with the relative position of the lights. Following this method, both a map of the area and an enhanced map embedding the coordinates of high-contrast images are created.

When the apparatus or robot has traversed all areas to be mapped, the data is downloaded into a compiling program that calculates the position of the high-contrast feature's center point in the map file created using GIS software. Other sensor readings are fused into the same map file.

In embodiments where the map is previously provided, while navigating through the environment using GIS and other data, the robot will watch for high-contrast features or images on the ceiling. When a high-contrast feature or image is visible, the robot will calculate the center point of the high contrast feature or image and compare it with the expected position, based on the stored map data. If a high-contrast feature or image appears where none is expected, the robot will use Markov probability techniques to determine the most likely actual location of the robot, given the position of the high-contrast feature or image combined with other current sensor readings and stored maps of the space.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for generating an enhanced map comprising:
   obtaining at least one image of a view in an area from an upward facing fisheye camera imaging device;
   identifying at least one high-contrast feature in the image;
   providing non-visible light radiation to the area whereby the radiation creates the at least one high-contrast feature in the image:
   processing the location of the upward facing fisheye camera based from a plurality of sensors including the upward facing fisheye camera;
   adjusting the location of the upward facing fisheye camera on a map of the area based on the sensor data; and
   generating an enhanced map of the area by embedding the high-contrast feature in the map of the area whereby the enhanced map is used to determine position of the imaging device.

2. The method of claim 1 wherein said at least one high-contrast feature is at least one ceiling light in said area.

3. A method for generating an enhanced position-determination of a spatial data collection device comprising:
   providing radiation to the area whereby the radiation creates at least one high-contrast feature in the image:
   identifying the at least one high-contrast feature in a view using the spatial data collection device having an imaging device that need not see a horizon line;
   calculating center point coordinates of the at least one high-contrast feature;
   comparing the center point coordinates from at least two known points of view; and
   determining actual location of the spatial data collection device based on results of the comparing wherein the spatial data collection device determines the spatial data collection device location.

4. The method of claim 3 further comprising generating a map of said area.

5. The method of claim 3 wherein said at least one high-contrast feature is at least one ceiling light in said area.

6. A method for generating an enhanced map comprising:
   obtaining at least one image of a view of an area using a spatial data collection device;
   identifying at least one high-contrast feature in said image;
   determining distance of said at least one high-contrast feature from said spatial data collection device;
   generating a spatial database of said view and said at least one high-contrast feature;
   embedding said high-contrast feature in a previously prepared spatial database of said area of said view; and
   generating an enhanced map of said area whereby the enhanced map is used to determine position of said device.

7. The method of claim 6 further comprising providing radiation to said area whereby said radiation creates said at least one high-contrast feature in said image.

8. The method of claim 6 further comprising generating a map of said area.

9. The method of claim 6 wherein said at least one high-contrast feature is at least one ceiling light in said area.

10. A method for generating an enhanced map comprising:
    generating a map of an area;
    obtaining at least one view of said area from a predetermined position;

identifying at least one high-contrast image in said view from an upward facing imaging device that need not see a horizon line;

processing the location of the upward facing imaging device based from a plurality of sensors including the upward facing imaging device;

adjusting the location of the upward facing imaging device on the map of the area based on the sensor data; and generating an enhanced map of said view by embedding the high-contrast feature in a map of the area whereby the enhanced map is used to determine position of the imaging device.

11. The method of claim 10 further comprising providing radiation to said area whereby said radiation creates said at least one high-contrast feature in said image.

12. The method of claim 10 wherein said at least one high-contrast feature is at least one ceiling light in said area.

13. A method for generating an enhanced map comprising:
obtaining at least one view of an area from a spatial data collection device at a predetermined position;

providing radiation to the area whereby the radiation creates at least one high-contrast feature in the image:

identifying the at least one high-contrast image in the view from an upward facing imaging device;

processing the location of the upward facing imaging device based from a plurality of sensors including the upward facing imaging device;

adjusting the location of the upward facing imaging device on the map of the area based on the sensor data; and generating an enhanced map of the area by embedding the high-contrast feature in a map of the area whereby the enhanced map is used to determine position of the imaging device.

14. The method of claim 13 wherein the radiation generation is integrated onto the spatial data collection device.

15. A system for generating an enhanced map comprising:
a spatial data collection device;
a camera integrated onto said spatial data collection device, said camera facing upward and not needing to see a horizon line;

means for determining position of said spatial data collection device;

means for determining presence and position of at least one high-contrast feature in a view of an area;

means for storing position data of said at least one high-contrast feature;

means for calculating position of said at least one high-contrast features' center point;

means for determining if features are located differently than expected;

means for adjusting the spatial data collection device on a map based on calculations given the data on features and spatial data; and means for generating an enhanced map of an area using said position data and previously created map.

16. The system of claim 15 further comprising means for generating radiation, said means for generating radiation integrated onto said spatial data collection device, whereby said means for generating radiation produces at least one high-contrast feature in said view of said area.

17. A system for generating an enhanced map comprising:
a spatial data collection device;
a camera integrated onto said spatial data collection device, said camera facing upward and not needing to see a horizon line;

means for determining position of said spatial data collection device;

means for determining presence and position of at least one high-contrast feature in a view of an area;

a means for generating radiation integrated onto said spatial data collection device, said means for generating radiation producing at least one high-contrast feature in said view of said area;

means for storing position data of said at least one high-contrast feature;

means for calculating position of said at least one high-contrast features' center point; and means for generating an enhanced map of an area using said position data and previously created map.

* * * * *